United States Patent [19]

Hough et al.

[11] Patent Number: 4,642,867

[45] Date of Patent: Feb. 17, 1987

[54] BRUSH SEAL MANUFACTURE

[75] Inventors: Gerald W. Hough; Ian A. Hunt, both of Derby, England

[73] Assignee: Rolls-Royce Limited, London, England

[21] Appl. No.: 827,055

[22] Filed: Feb. 7, 1986

[30] Foreign Application Priority Data

Feb. 20, 1985 [GB] United Kingdom ............... 8504330

[51] Int. Cl.⁴ ............................................. B23K 31/02
[52] U.S. Cl. ........................................ 29/423; 29/445;
228/212; 228/160; 300/21
[58] Field of Search ............... 29/423, 445, 469.5;
277/53, 95, 227, 235; 415/174; 300/21;
228/159, 160, 173.5, 128, 212

[56] References Cited

U.S. PATENT DOCUMENTS

| Re. 30,206 | 2/1980 | Ferguson et al. | 228/212 |
|---|---|---|---|
| 885,032 | 4/1908 | Ferranti | 277/95 |
| 1,713,027 | 5/1929 | Cleaves | 300/21 |
| 2,363,685 | 11/1944 | Neuschaeffer | 300/21 |
| 2,449,668 | 9/1948 | Peterson | 300/21 |
| 2,672,640 | 3/1954 | Peterson et al. | 300/21 |
| 2,878,048 | 3/1959 | Peterson | 277/53 |
| 2,984,053 | 5/1961 | Peterson | 300/21 |
| 4,202,554 | 5/1980 | Snell | 277/53 |
| 4,204,629 | 5/1980 | Bridges | 228/178 |
| 4,274,575 | 6/1981 | Flower | 228/178 |

Primary Examiner—M. Jordan
Attorney, Agent, or Firm—Parkhurst & Oliff

[57] ABSTRACT

An apparatus for use in the manufacture of brush seals which comprise a plurality of filaments of brush material sandwiched between two sideplates. The apparatus comprises a workplate onto which is mounted one of the sideplates of the seal. A plurality of first clamping members clamp against the sideplate. Each member can be lifted to enable a tuft of brush material to be inserted and clamped against the sideplate. To enable more than one layer of tufts to be built up on the sideplate a second clamping means is provided to enable the first clamping members to be released. An indexing mechanism allows the first clamping members to be moved relative to the clamped tufts and when the assembly of tufts is complete a second sideplate is clamped onto the tufts and first sideplate. The apparatus also includes means for cutting a prewound ribbon of adhesively bonded wires into short lengths to form the tufts.

27 Claims, 16 Drawing Figures

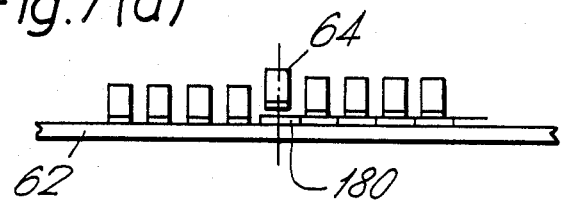
Fig.7(a)
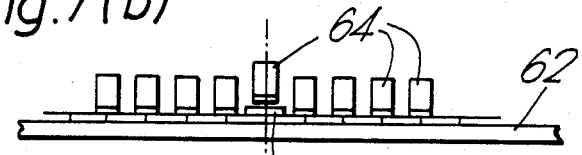
Fig.7(b)
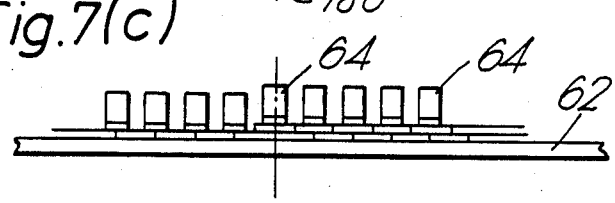
Fig.7(c)
Fig.8(a)     Fig.8(b)
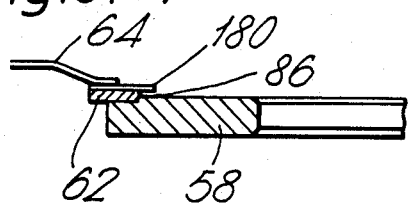 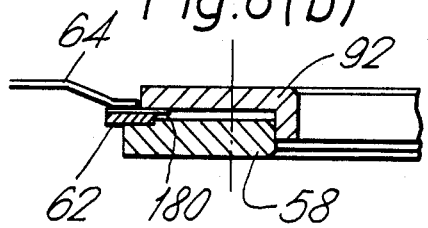
Fig.8(c)    Fig.8(d)
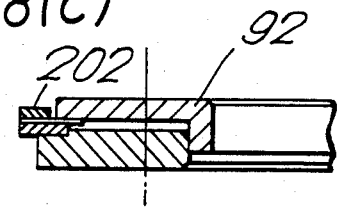 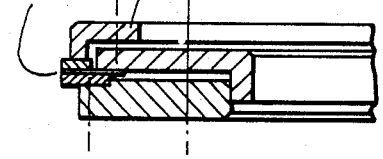

BRUSH SEAL MANUFACTURE

The present invention relates to methods of manufacturing brush seals, and to apparatus for making brush seals.

In our UK Pat. No. 2,001,400B there is described and claimed a Brush Seal which is formed by mounting a first side-plate of the seal on a mandrel winding at least one continuous filament of bristle material onto the side-plate in such a manner that the material lies across an exposed face of the side-plate positioning a further side-plate to overlie the bristle material on the face of the first side-plate, thus sandwiching the bristle material between the two side plates, leaving some bristle material projecting from one edge of the side-plate pair integrally joining the bristle material to the side plate pair between which it is trapped at the other edge thereof cutting the bristle material, and removing the side-plates from the mandrel.

This method of manufacture whilst producing adequate seals has the main disadvantage in that it lacks the ability to ensure the strands are accurately positioned relative to their neighbours. This results in some wires overlapping and in small gaps forming between the strands, which reduces the sealing efficiency. Further disadvantages of this method reside in the use of a complicated and hence expensive method of filament winding, in its requirements for a new and expensive mandrel for each seal of a different diameter and in the low utilisation of the expensive wire material.

These disadvantages are overcome at least in part by our co-pending application Ser. No. 827397 of same date and naming J Goddard and S A Bridges as the inventors, in which there is described and claimed a method of producing a brush seal comprising the steps of:

(a) forming a tape which comprises one or more layers of parallel contiguous lengths of filaments adhesively bonded together to form a self supporting body;

(b) cutting the tape into discrete portions and forming a plurality of tufts of bonded filaments therefrom;

(c) assembling a plurality of tufts closely adjacent to each other in a support member with a part of each tuft projecting from the support member;

(d) securing each tuft in the support member; and, (e) removing the adhesive from at least that part of each tuft which projects from the support member.

A major advantage of the method described in the above mentioned co-pending application resides in bonding the wires together, this prevents stray wires overlaying their neighbours and substantially reduces the chances of gaps forming between the wires which reduce the sealing efficiency. Further advantages reside in the use of a simplified method of producing the tufts, in the lack of expensive tooling, and in the high utilization of the expensive wire material. However this method of manufacture, whilst producing excellent seals, relies heavily upon manual operations and does not lend itself to automation.

It is an object of the present invention at least to reduce, and possibly eliminate these disadvantages by adapting the components of the brush seal such that they more readily lend themselves to the use of a semi automated method of production, and providing a machine capable of at least automatically cutting the tufts of brush material from a ribbon of wire and assembling said tufts onto a seal backing ring.

Embodiments of the present invention will now be more particularly described by way of example only, with reference to the accompanying drawings in which.

FIGS. 7a, b, c illustrate the sequence of tufts laying required to produce a brush seal.

FIGS. 8a, b, c, d illustrate the various stages of clamping required in the production of such a seal.

Figure 9:
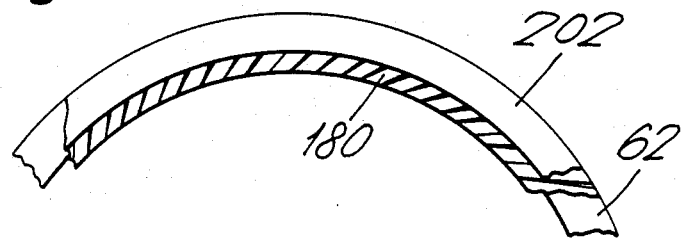

FIG. 9 is a partial view of a completed brush seal.

Figure 10:
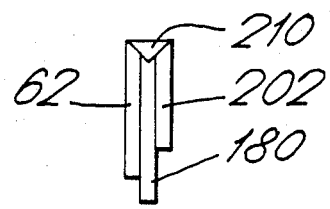

FIG. 10 is an enlarged cross sectional view of the brush seal shown in FIG. 9.

Figure 11:
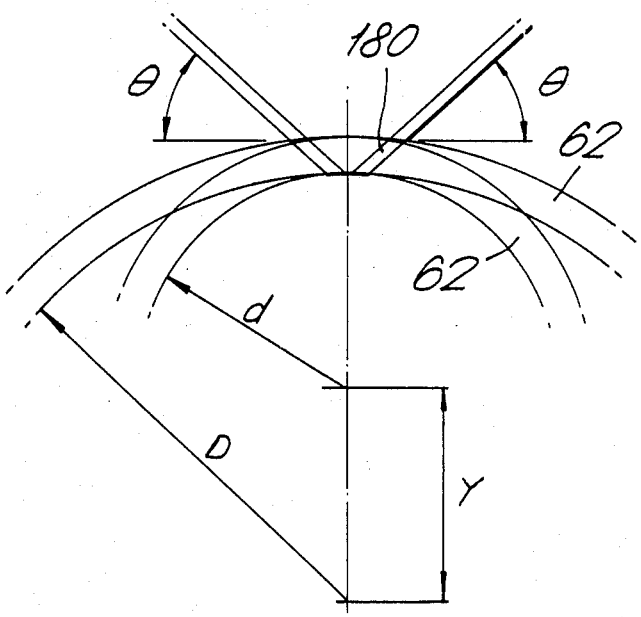

FIG. 11 illustrates the variation in loading geometry required to facilitate the production of a range of seal diameters.

Figure 1:
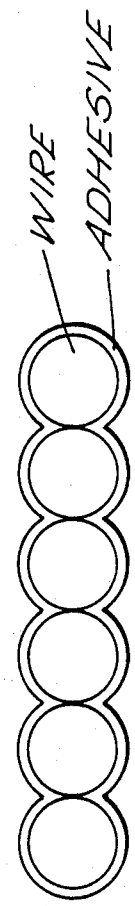
FIG. 1 is a cross sectional view of a close packed ribbon of wire of the type that would be produced using the method described in the above mentioned co-pending application.

Referring to FIG. 1 there is shown a ribbon comprising a plurality of wire filaments 2 bonded together along their length with an adhesive such that each filament lies parallel to, touching, and in the same plane as, its neighbour. The method of manufacturing the ribbon of the present invention is described in the above mentioned co-pending application. In the above mentioned co-pending application the term, "tape" and "ribbons" are used. In the present application the term "ribbon", is taken to include both "tapes" and "ribbons" as used in the co-pending application. For the purposes of the present invention the ribbon may be a single layer or a multilayer, and as will be explained later herein, the apparatus of the present invention is provided with means to cut the tape into discrete lengths. These cut lengths of the ribbon will hereinafter be referred to as "tufts".

Figure 2:
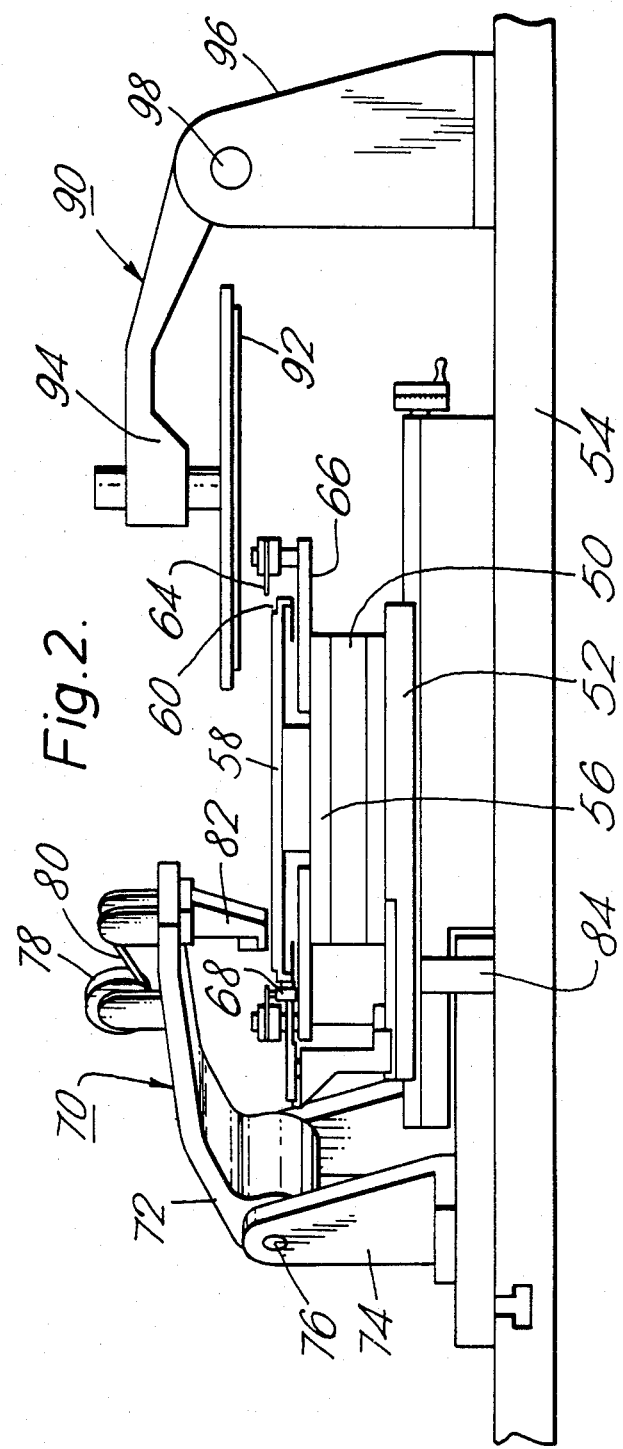
FIG. 2 illustrates schematically a machine capable of assembling the tufts of brush material onto a seal backing ring constructed in accordance with the present invention.

In FIG. 2, there is shown schematically a machine capable of assembling tufts of brush material onto an annular side plate which constitutes a backing ring. The machine has a circular rotary work table (50) which is mounted on a carriage (52) located at the mid point of the base portion (54). A circular work plate (56) is centrally mounted on top of the work table (50) and carries an assembly ring (58) central to its axis of rotation. The assembly ring is provided with a groove (60) at its outer circumference which is shaped to communicate with a seal backing ring (62) (not shown in FIG. 2 but shown in FIG. 8).

A plurality of pre-sprung clamping fingers (64) are circumferentially spaced around a radially extending portion of the work plate (56). Each clamping finger (64) acts to retain the seal backing ring (62) in the groove (60). A finger lifting plunger (68) is provided to release the clamping force of the fingers (64) as required.

A ribbon cut off and insertion station (70) is located at one end of the base plate (54) and comprises a hinged arm (72) pivotally located in a support bracket (74) by pin (76), a dispensing reel (78) supplied with a length of ribbon material (80) and a work head (82), which will be described in detail later. The support bracket (74) is pivotably mounted about a location pin (84) such that the angle of insertion may be varied. Means not shown are provided for retaining the support bracket (74) in its desired location.

In operation, the work head (82) is located on the radially innermost side (86) of the backing ring (62). However, it will be appreciated that the working head (82) may be removed from this position to allow access to the backing ring should this be required. An indexing/clamping/unloading station (90) is situated at the otherwise free end of the base plate (54). The station (90) comprises a circular clamping plate (92) slidably mounted at one end of a support arm (94) and a support bracket (96) which is fixed relative to the base portion the support arm (94) is pivotally connected to the bracket (96) by pin (98). Means (not shown but well understood per-se) are provided to lock both the support arm (94) and the clamping plate (92) in any desired position.

Lifting means (not shown but well understood per-se) are provided to lift the entire collection of clamping fingers (64) out of contact with the backing ring (62) in unison when desired.

Figure 3:
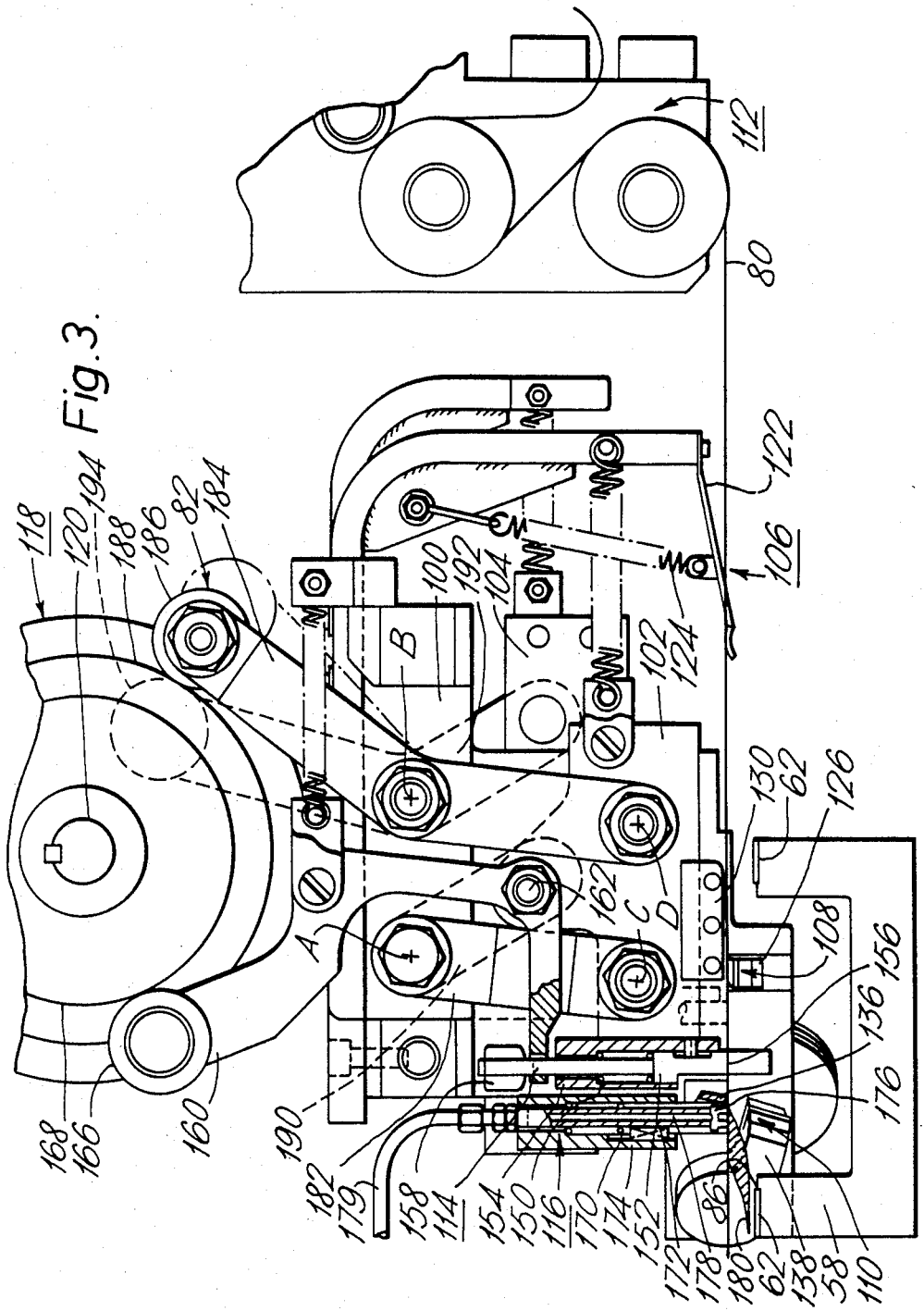
FIGS. 3 and 4 illustrate in more detail the cut off and insertion station shown in FIG. 2.
Figure 4:
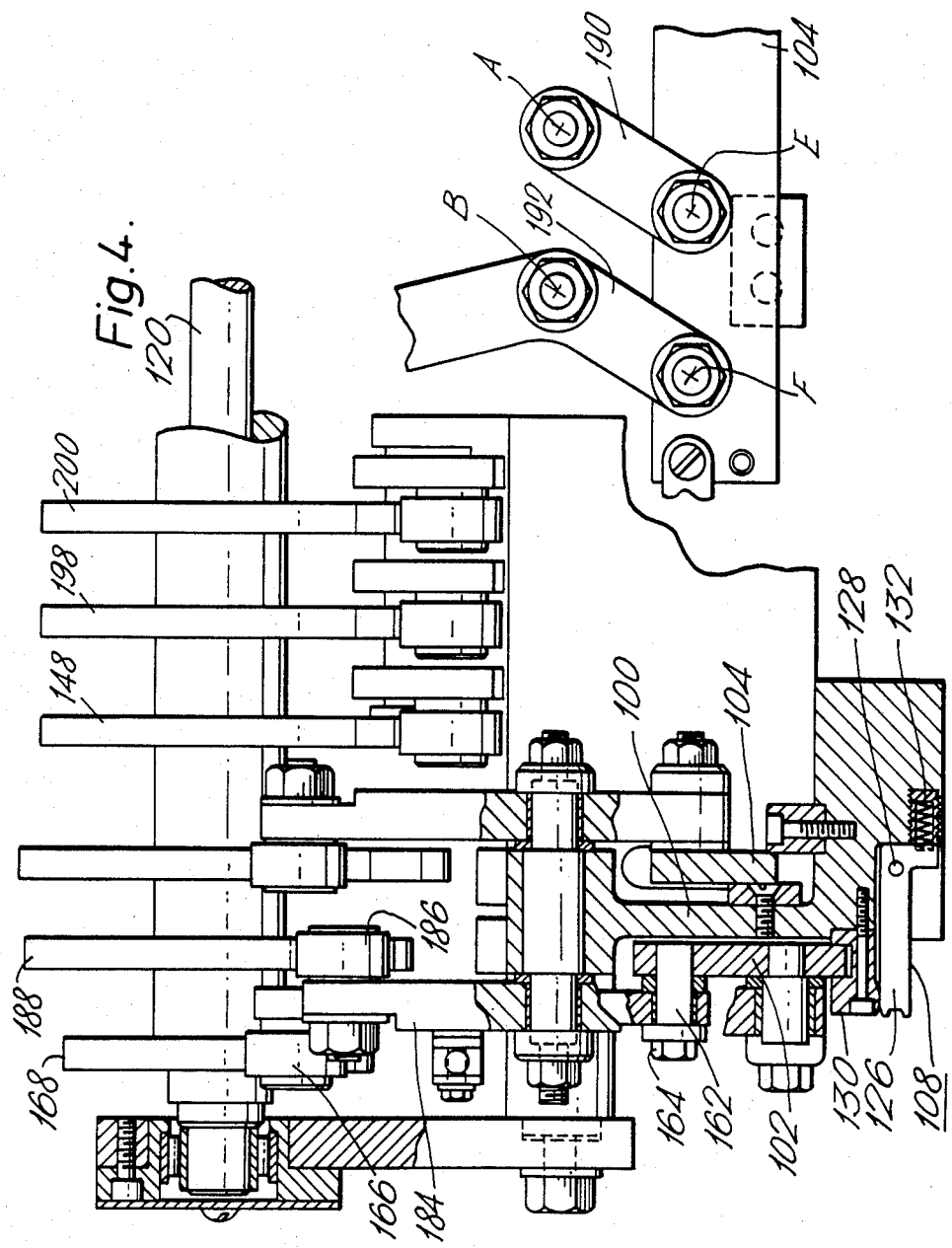

Referring now to FIGS. 3 and 4, the workhead (82) comprises a main body (100) upon which is mounted a first moving portion (102) and a second moving portion (104). A ribbon tensioning means (106), an adjustable ribbon friction clamp (108), a ribbon cutting means (110) and a feed control device (112) are all mounted on the main body (100). A ribbon clamping means (114) and a tuft lifting means (116) are mounted on the first and second moving portions (102), and (104) respectively. A series of cams (118) are mounted on a common shaft (120) and act to cause motion of the clamping means (114) cutting means (110) and lifting means (116) as will be described later.

The ribbon tensioning means (106) comprises a lifting finger (122) positioned to communicate with the underside of the ribbon (80) and a spring loaded arm (124) connected at one end to the finger (122) and at its other end to a fixed portion of the workhead (82). The spring acts to urge the ribbon (80) upwards and thus tensions the ribbon (80).

The friction clamp (108) best seen in FIG. 4 comprises a dog leg lever arm (126) pivotally mounted to the main body (100) by pin (128), a reaction pad (130) and a tension adjusting screw (132) situated at a first end of the arm (126). The ribbon (80) is fed between the reaction pad (130) and a second end of the arm (126) and is frictionally engaged between the two by adjusting screw (132).

Figure 5:
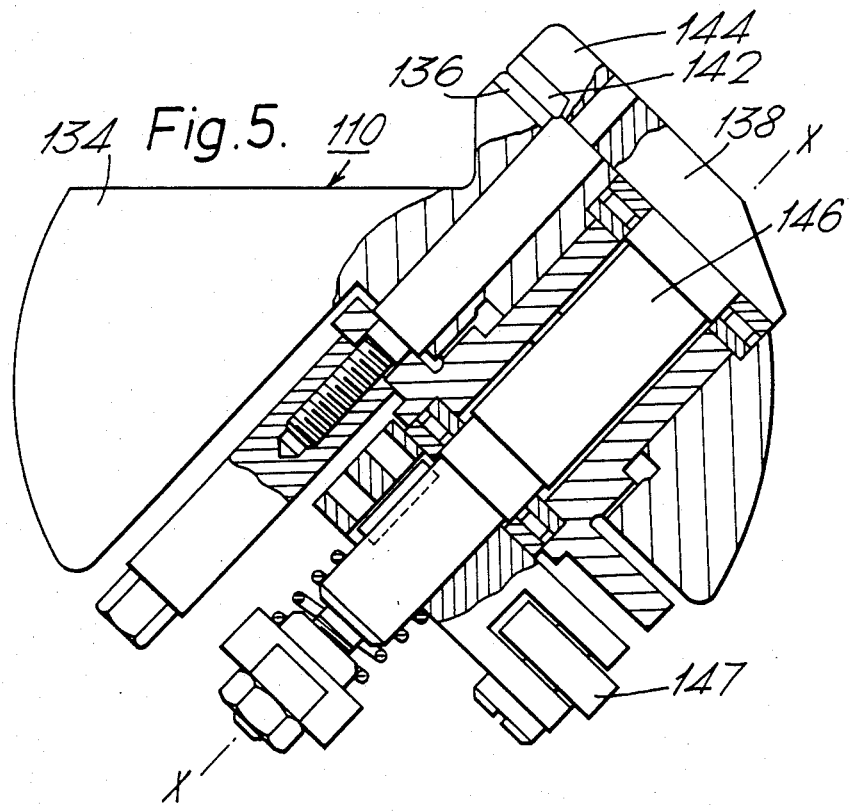
FIG. 5 illustrates in detail the cutting means shown in FIG. 3.
Figure 6:
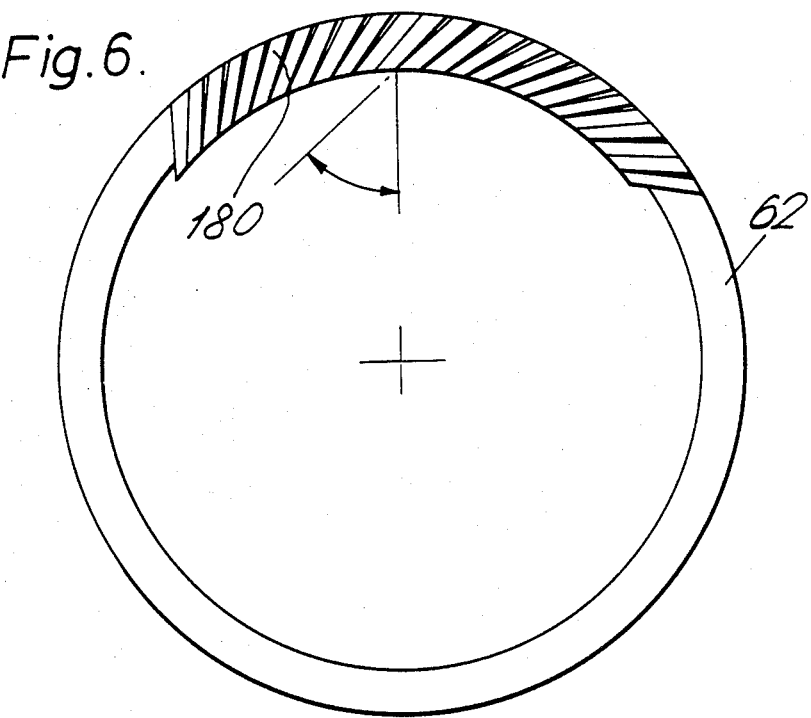
FIG. 6 shows the arrangement of tufts as they would be laid down on a backing ring by the machine shown in FIG. 2.

The ribbon cutting means (110) best seen in FIGS. 3 and 5 comprises a base portion (134) formed by at least part of the main body (100), a first cutting edge (136) mounted on the base portion (134), and a cutting arm (138) mounted for rotation about axis (X) on a shaft (146). The cutting arm (138) is provided with a cutting edge (142) mounted at its tip (144) which communicates with the first cutting edge (136) upon rotation of the cutting arm (138) to cut the ribbon (80). The shaft (140) is provided with a cam following mechanism (147) which communicates with cam (148) to achieve rotation of the cutting arm (138). Means are provided to adjust the gap between the first and second cutting edges (136, 142) and for retaining the cam following mechanism (146) in the correct position relative to the cam (148) when adjustment does take place.

The ribbon feeding means and feed control device (112) are of conventional form and are therefore not described in detail herein. However, their effect is to ensure the ribbon (80) is fed to the work head (82) at an even rate, thus ensuring consistent results.

The ribbon clamping means (114) comprises a spring (150) actuated piston (152) slidably mounted in a sleeve (154) joined to the first movable portion (102) of the workhead. (82). The piston (152) is provided at one end with a friction surface (156) designed to engage the ribbon material (80) for the transportation of the ribbon (80) and at its other end with a lifting head (158). A cranked lever arm (160) is pivotally mounted to the first movable portion (102) of the workhead (82) by pin (162) and retained in position by nut (164). One end of the lever arm (160) is provided with a cam follower (166) which communicates with cam (168), the other end is shaped to communicate with the lifting head (158) to lift the piston (152) in accordance with the cam profile.

The tuft lifting means (116) comprises a spring (170) loaded piston (172) slidably mounted in a sleeve (174) joined to the second movable portion (104) of the workhead (82). The piston (172) is provided at one end with a plurality of small bore holes (176) which communicate with a source of low pressure (not shown) via a large bore passage way (178) which runs the length of the piston (172) and a flexible pipe (179). The spring (170) acts to urge the piston (172) into contact with the tuft (180). The tuft (180) is held in position on the end of the piston (172), when required, by a suction effect created when the holes (176) are connected to a source of low pressure. Means, not shown but well understood per-se, are provided to release this effect and thus drop the tuft (180) when desired.

The first movable portion (102) is linked in an articulated fashion to the main body (100) via a pair of parallel acting first and second pivot arms, (182) and (184) respectively. Each arm (182) and (184) pivots and points A and B on the main body and C and D on the movable first portion respectively.

A portion of the second arm (184) is extended away from pivot point (B) and is provided at its end with a cam follower (186) which communicates with cam (188). The cam is profiled such that, when it is rotated, it causes lever arms (182) and (184) the first moving portion (102) and hence the clamping means (114) to move forward from a first retracted position (not shown) to a second extended position shown in FIG. 3. The clamping piston (152) and its associated cam (188) are used in conjunction with the movement of the first movable portion (102) to advance the ribbon (80) towards the cutting means (110). This is achieved by causing piston (152) to engage frictionally the ribbon material on the forward stroke such that the ribbon is advanced to a point beyond the cutting means (110), and disengaging the piston from the ribbon on the backward stroke such that the ribbon (80) remains in its forward position.

The second movable portion (104) is also linked in an articulated fashion to the main body (100) via a pair of parallel acting first and second pivot arms (190) and (192) respectively, (shown dotted in FIG. 3 and in full in FIG. 3a). Each arm (190) and (192) pivots about points A and B on the main body (100) and points E and F (see FIG. 3a)) on the movable second portion (104) respectively. A portion of the second arm (192) is extended away from pivot points B and is provided at its end with a cam follower (194) which communicates with cam (196). The cam (196) is profiled such that, when it rotates, it causes lever arms (190) and (192), the second moving portion (104) (and hence the tuft lifting means (116)) to move through an arc from a first retracted position (shown in FIG. 3) to a second extended position, not shown.

A further two cams (198) and (200) (See FIG. 3) are provided on the cam shaft (120) which act with means (not shown but well known per-se) to activate the lifting plunger (68) (see FIG. 2) and to index the work table (50) from a first position where a first tuft (180) is laid down on the backing ring (62) to a second and subsequent positions where a second and subsequent tufts (180) are laid down.

The lifting means (116) and its associated cam (196) are used in conjunction with the movement of the second moving portion (104) to advance a tuft (180), cut from the ribbon (80) by the action of the cutting means (110) as previously described, to an advance position of the tuft (180), where it is positioned on the backing ring (62). To achieve this effect the following steps are required.

Firstly, a backing ring (62) is positioned in the groove (60) of the assembly ring (58). Then a first clamping finger (64) is lifted from the backing ring (62) at a position adjacent the tuft (180) as shown in FIG. 7a by means of the plunger 68.

The tuft lifting means (116) is actuated by creating a suction in pipe (179) to lift the tuft (180) when the second moving portion (104) is in its retracted position. The second moving portion (104) is moved forward to its advanced position to carry the tuft in such a manner that the leading edge of the tuft (180) describes the arc (202) illustrated in FIG. 3 and its moved to a position under finger (64). The lifting means (116) is moved towards the backing ring (62) so that the tuft (180) is sandwiched therebetween and retained in position by the compression spring (170) of the lifting means. The lifting force on the first clamping finger (64) is then released so that the finger (64) acts to clamp the tuft (180) against the backing ring (62).

Finally, the tuft (180) is releasd from the lifting means (116) by relaxing the suction and the lifting means (116) is returned to its first (retracted) position.

Referring now to FIG. 7. Subsequent tufts (180) are laid down by indexing the work plate (56) to a second position at which the next adjacent clamping finger (64) is opposite the working head (82) and the above sequence of operations is repeated. It may be necessary to cut and lay the final tuft (180) in any one layer by hand to ensure a perfect fit.

The entire work table (50) is transported along the carriage way (52) to a position immediately below the clamping plate (92) and the plate (92) is lowered to clamp the radially innermost ends of the tufts (180) to the backing ring (62). The retaining force of all clamping fingers (64) is then released simultaneously and the work table (50) is indexed one half on the width of one segment (180) at the circumference of the backing ring (62). The clamping fingers (64) are then reengaged to clamp all the tufts against the backing ring and clamping plate (92) removed. The work table (50) is then transported back to the position where the loading of the tufts may be continued. FIGS. 7b and c illustrate how each segment (180) in the second layer overlaps the gaps formed at the radially outermost portion of the tufts (180) in the first layer.

Subsequent layers of tufts (180) may be laid down onto the backing ring (62) by repeating the above operation. Overlaying the tufts (180) of a number of layers in the manner described above greatly increases the sealing efficiency of the seal by reducing the leakage path between tufts (180).

Upon laying the final layer of tufts (180), the clamping plate (92) is again engaged to clamp the layers of tufts (180) to the backing ring (62) (FIG. 7b) and the clamping fingers (64) are withdrawn (FIG. 8c), and removed from the machine. A covering ring (202) is then placed over the tufts (180) at their radially outermost point and is clamped to the tufts by a clamping ring (204) which is securely clamped to the assembly ring (458) (FIG. 8d). The clamped assembly comprising the assembly ring (58) seal assembly (206), and clamping ring (204), are then removed from the work table (50) and the tufts (180) integrally joined to the rings (62) and (202) between which they are sandwiched by welding. The clamping rings 92 and 204 are removed and the completed brush seal is taken off the work table (50) to leave a brush seal as shown in FIG. 10. From FIG. 10, it will be seen that a portion of the weld material (210) will fuse with the radially outermost ends of the tufts (180), thus ensuring a good location of the tufts (180) in the seal (206).

Turning now to FIG. 11, it will be seen that in order to accommodate the production of clockwise or counter-clockwise rotating seals (206) it is necessary to vary the angle O which the segment makes with the tangent of the outer diameter of the seal. On seals of large diameter, it may be possible to vary this angle by swinging the entire ribbon cut-off and insertion station (70) about location pin (84). On seals of smaller diameters this may not be possible due to the restricted movement available on the inside of the seal. It may therefore be necessary to have one workhead (82) designed to be used in the production of clockwise rotating seals (206) and one for counter clockwise rotating seals (206). It will be appreciated however that both these workheads (82) will be substantially as described above.

In order to accommodate a range of seal diameters, it will be necessary to provide a range of different diameter assembly rings (58), backing rings 62, clamping plates (92), and clamping rings (204) together with clamping finger assemblies (64) arranged at the required diameters. The different seal diameters are easily accommodated by varying the offset (Y) of the centre of the rotating work table (150) along the carriage way (52) such that the workhead (82) may communicate with the backing ring (62) as described above.

The welding operation may be sufficient to burn off the adhesive applied to the wire during manufacture. However, if this is not the case the adhesive may be removed by the use of solvent or the application of more heat.

A final finishing operation may be required to trim the inner diameter of the tufts (180) to their final sealing diameter, this may for example include tip grinding or cutting with an abrasive wheel. This may be carried out before or after the removal of the adhesive from the projecting wires.

In the above example of an apparatus constructed in accordance with the present invention, the clamping fingers 64 are assembled around the outer perimeter of the work table 58 and the ribbon feeding and insertion station 70 is located at a radially inner location relative to the backing ring 62 of the seal. However it is to be understood that the clamping fingers 64 may be located at an inner most region relative to the backing ring 62 and may be designed to clamp the inserted tufts against either the backing ring 62 or the assembly ring 58. In this case the ribbon or the linear brush seal could be edge rolled to form a hoop with the filaments extending either inwards or outwards. To make a linear brush seal it would be necessary to use linearly extending seal backing members 62 and to translate the backing members 62 linearly relative to the ribbon feeding and insertion station 70.

We claim:

1. An apparatus for use in the manufacture of brush seals which comprise a plurality of filaments of brush material sandwiched between a first and a second side plate, the apparatus comprising:

a work plate, adapted to receive the first side plate;

a plurality of first clamping members, spaced along a patch adjacent to the first side plate and operable in a direction towards the side plate;

actuator means, operable to lift sequentially selected first clamping members thereby to define a gap between the lifted member and the side plate;

insertion means, operable to insert a plurality of filaments into the gap and to cause the filaments to lie on, and project beyond, the first side plate;

a second clamping means, for clamping against the first side plate those plurality of filaments which lie against the side plate and;

releasing means for releasing the clamping effect of the first clamping members when the plurality of filaments are clamped by the second clamping means.

2. An apparatus according to claim 1 wherein the plurality of filaments define a tuft and wherein a third clamping means is provided which is operable to clamp the second of the side plates on to the tufts which are clamped against the first side plate by the second clamping means, prior to securing the two side plates and the tufts together to form the brush seal.

3. An apparatus according to claim 1 wherein the plurality of filaments define a tuft and an indexing means is provided which is operable, when the first clamping members are released and the second clamping means engaged, to index the first side plate by a distance sufficient to cause successive layers of the tufts to be laid up with the tufts of each layer overlapping the spaces between adjacent tufts of immediately adjacent layers.

4. An apparatus according to claim 1 wherein the workplate is mounted on a support means which is relatively movable to, and from, a first position, where the first side plate is located adjacent the insertion means and to and from, a second position where the first side plate is positioned adjacent the second clamping means.

5. An apparatus according to claim 1 wherein the side plates are annular backing rings, the workplate is rotatably mounted relative to a support means and the workplate has a circumferentially extending groove shaped to receive one of the annular backing rings.

6. An apparatus according to claim 5 in which the first clamping members are spaced circumferentially around the workplate and the members act to retain the outside edge of the first side plate in thh groove.

7. An apparatus according to claim 5 in which the second clamping means acts to retain the inside edge of the first side plate in the groove.

8. An apparatus according to claim 1 in which the first clamping means comprises a plurality of circumferentially spaced flexible fingers each having a first end fixed relative to the workplate and a free end which in a first position is urged into contact with the backing ring, and thus retains the ring in the groove and in a second position is urged out of the contact with the backing ring.

9. An apparatus according to claim 1 in which the actuator means comprises a lifting plunger which in a first position acts to allow the finger to contact the backing ring and in a second position acts to urge the finger out of contact with the backing ring.

10. An apparatus according to claim 1 in which the plurality of filaments are cut from a ribbon comprising a plurality of longitudinally extending strands of wire bonded together along their length such that each strand lies parallel to, touching and in the same plane as its neighbour.

11. An apparatus according to claim 1 wherein the plurality of filaments define a tuft and in which the insertion means comprises a workhead having a fixed portion and first and second moving portions, a ribbon dispensing means, a ribbon tensioning means a ribbon cutting means and a first ribbon clamping means each mounted on the fixed portion, a second ribbon clamping means mounted on the first moveable portion and a ribbon transporting means mounted on the second moveable portion.

12. An apparatus according to claim 11 in which the ribbon dispensing means comprises a reel of pre-wound ribbon.

13. An apparatus according to claim 11 in which the ribbon tensioning means comprises a spring loaded arm shaped and positioned to tension the ribbon between the dispensing means and the ribbon clamping means.

14. An apparatus according to claim 11 in which the ribbon cutting means comprises a base portion formed by at least part of the fixed portion which has a first cutting edge, a cutting arm having a second cutting edge and being pivotable about an axis (x) such that the first cutting edge co-operates with the second cutting edge, to cut a tuft from the ribbon, and means to move the cutting arm.

15. An apparatus according to claim 11 in which the first ribbon clamping means comprises a lever arm pivotally mounted to the fixed portion of the workhead and having a first end provided with a means for adjusting the tension and a second end which acts to engage frictionally the ribbon against a reaction pad on the fixed portion.

16. An apparatus according to claim 11 in which the second ribbon clamping means comprises a spring actuated piston slidably mounted in a sleeve joined to the first moveable portion of the workhead, the piston being provided at a first end with a friction surface designed to engage the ribbon material and at a second end with a lifting head designed to co-operate with a lifting means which moves the piston from a first position, in which the spring urges it into contact with the ribbon to clamp the ribbon to the first moving portion, to a second position in which the piston is moved out of contact with the ribbon.

17. An apparatus according to claim 11 in which the lifting means comprises a spring actuated piston slidably mounted in a sleeve joined to the second movable portion of the workhead, the piston being provided at one end with a plurality of small bore holes which communicate with a source of low pressure via a large bore passageway provided along the length of the piston and a flexible pipe connected to the second end of the piston, said source of low pressure acting to hold the tuft in position against the first end of the piston when desired and being provided with actuation means to release the hold when desired.

18. An apparatus according to claim 11 in which an actuation means is provided to move the first moving portion of the workhead from a first position, in which the second clamping means is activated to clamp the ribbon to a second position, in which the ribbon is advanced towards the cutting means.

19. An apparatus according to claim 11 in which actuation means are provided to move the second moving portion of the workhead from a first position, in which the tuft lifting means is activated to lift the tuft, to a second position, in which the tuft is positioned over the backing ring.

20. An apparatus according to claim 11 in which the workhead is positioned on the radially innermost side of the backing ring and each tuft is laid down on the backing ring such that its longitudinal axis lies at an angle $\theta$ to the tangent of the outside diameter of the backing ring.

21. An apparatus according to claim 11 in which the workhead is attached to a first end of an arm, said arm being pivotally connected at its other end to a support bracket which is pivotally mounted about a location pin in a base plate of the apparatus such that the angle $\theta$ may be varied.

22. An apparatus according to claim 21 in which means are provided to lock the support arm and the support bracket in any desired position.

23. Apparatus according to claim 5 wherein the third clamping means comprises a clamping ring which is fastenable to the worktable and is operable to clamp a second of the side plates against the plurality of filaments, prior to securing the two plates and the plurality of filaments together.

24. Apparatus according to claim 1 wherein the side plates extend linearly and the path along which the first clamping members are spaced extends linearly.

25. A method of manufacturing a brush seal comprising the steps of providing a first side plate of the seal sequentially laying tufts of brush material side-by-side onto the first side plate and clamping each tuft against a reaction surface as it is laid onto the first side plate with a first clamping means and subsequently clamping a second side plate against those tufts clamped by the first clamping means prior to securing the two side plates and the tufts together to form the brush seal.

26. A method according to claim 25 wherein a second clamping means is provided and the method includes the steps of clamping the tufts which are already clamped by the first clamping means indexing the first clamping means relative to the first side plate and the tufts clamped by the second clamping means by a distance sufficient to cause successive layers of the tufts of each layer to be laid up with the tufts of each layer overlapping the spaces between adjacent tufts of immediately adjacent layers.

27. A method according to claim 26 wherein a third clamping means is provided and the method includes the step of clamping the second sideplate against the tufts and the first sideplate, and the second clamping means is subsequently removed prior to securing the two sideplates and the tufts together to form the brush seal.

* * * * *